(12) United States Patent
Kim et al.

(10) Patent No.: US 7,846,594 B2
(45) Date of Patent: Dec. 7, 2010

(54) REFORMER AND FUEL CELL SYSTEM HAVING THE SAME

(75) Inventors: Ju-Yong Kim, Suwon-si (KR); Zin Park, Suwon-si (KR); Ji-Seong Han, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1261 days.

(21) Appl. No.: 11/165,846

(22) Filed: Jun. 23, 2005

(65) Prior Publication Data

US 2006/0008683 A1    Jan. 12, 2006

(30) Foreign Application Priority Data

Jun. 30, 2004    (KR) .................... 10-2004-0050673

(51) Int. Cl.
*H01M 8/06* (2006.01)
*B01J 10/00* (2006.01)

(52) U.S. Cl. .................... 429/423; 429/433; 422/188; 422/202

(58) Field of Classification Search .................... 429/20, 429/34, 423, 433; 422/188, 202
See application file for complete search history.

(56) References Cited

U.S. PATENT DOCUMENTS

2004/0126288 A1*  7/2004  Fuju et al. .................... 422/202
2004/0247960 A1*  12/2004 Sato et al. .................... 429/20
2006/0156628 A1*  7/2006  Waki .................... 48/127.9

FOREIGN PATENT DOCUMENTS

| JP | 2003-40605 A | 2/2003 |
|---|---|---|
| JP | 2004-59415 A | 2/2004 |
| JP | 2004-107175 A | 4/2004 |
| JP | 2004-171989 A | 6/2004 |
| WO | WO 00/64576 | 11/2000 |

* cited by examiner

*Primary Examiner*—Dah-Wei D Yuan
*Assistant Examiner*—Zachary Best
(74) *Attorney, Agent, or Firm*—Christie, Parker & Hale, LLP (57) ABSTRACT

There is provided a fuel cell system comprising: a reformer for generating a hydrogen gas stream from fuel through a catalytic chemical reaction using thermal energy; and a stack for generating electric energy through a reaction between the hydrogen gas stream and oxygen. The reformer includes: a first reaction section for generating thermal energy through an oxidation reaction of fuel during start-up of the fuel cell system; a second reaction section which communicates with the first reaction section and which generates the hydrogen gas stream from the fuel through a reforming reaction using the thermal energy; and a third reaction section which communicates with the first and second reaction sections, and which generates thermal energy through an oxidation reaction of carbon monoxide contained in the hydrogen gas stream, thereby reducing the concentration of carbon monoxide in the hydrogen gas stream.

14 Claims, 5 Drawing Sheets

REFORMER AND FUEL CELL SYSTEM HAVING THE SAME

CROSS-REFERENCE TO RELATED APPLICATION

This application claims priority to and the benefit of Korean Patent Application No. 10-2004-0050673 filed on Jun. 30, 2004 in the Korean Intellectual Property Office, the entire content of which is incorporated herein by reference.

FIELD OF THE INVENTION

The present invention relates to a fuel cell system and more particularly to a fuel cell system with an improved reformer.

BACKGROUND OF THE INVENTION

As is well known, a fuel cell is a system for generating electric energy through an electrochemical reaction between oxygen and hydrogen contained in hydrocarbon materials such as methanol, ethanol, and natural gas.

Recently developed polymer electrolyte membrane fuel cells (hereinafter, referred to as PEMFCs) have excellent output characteristics, low operating temperatures, and fast starting and response characteristics. Therefore, PEMFCs have wide ranges of applications including use as mobile power sources for vehicles, as distributed power sources for homes or buildings, and as small-sized power sources for electronic apparatuses.

A fuel cell system employing the PEMFC scheme basically requires a stack, a reformer, a fuel tank, and a fuel pump. The stack constitutes an electricity generator set having a plurality of unit cells. The fuel pump supplies fuel from the fuel tank to the reformer. Then, the reformer reforms the fuel to generate hydrogen gas that is supplied to the stack.

Since the reformer generates the hydrogen gas from the fuel through a catalytic chemical reaction that requires thermal energy, the reformer should include a heat source section for generating the thermal energy and a reforming reaction section for absorbing the thermal energy and generating the hydrogen gas from the fuel.

In the reformer of a conventional fuel cell system, since the heat source section and the reforming reaction section are formed in a separate vessels and the heat is distributed through a pipe, the heat exchange between the parts is not directly performed and thus it is disadvantageous in heat delivery. Since the respective parts are distributed, it is also difficult to make a compact fuel cell system.

In a conventional fuel cell system, since the fuel supplied to the reformer can be preheated using an additional preheating device, much energy is spent in preheating the fuel, thereby deteriorating performance and thermal efficiency of the entire fuel cell system.

In addition, a conventional fuel cell system generally has a plurality of carbon monoxide reducing sections for reducing the concentration of carbon monoxide through a water-gas shift (WGS) reaction of the hydrogen gas generated from the reforming reaction section or through a preferential CO oxidation (PROX) reaction of carbon monoxide contained in the hydrogen gas.

In a conventional reformer, since the reforming reaction section and the carbon monoxide reducing sections are provided separately and the hydrogen gas generated from the reforming reaction section is supplied to the carbon monoxide reducing sections, it is difficult to make a compact system. In a conventional reformer, the preferential CO oxidation of the carbon monoxide reducing sections is an endothermic reaction. Accordingly, when the heat generated through the endothermic reaction and the heat generated from the heat source section are more than 200° C., hydrogen is combusted with the heat, thereby deteriorating the efficiency of the reformer.

SUMMARY OF THE INVENTION

According to the present invention, a reformer for a fuel cell system is provided which can enhance reaction efficiency and thermal efficiency with a simple structure.

According to one embodiment of the present invention, a reformer is provided which can prevent hydrogen from being combusted due to excessive heat generated through an oxidation reaction for reducing the concentration of carbon monoxide contained in hydrogen gas.

According to an embodiment of the present invention, a reformer for a fuel cell system is provided comprising: a first reaction section for generating thermal energy through an oxidation reaction of fuel at the time of starting up the fuel cell system; a second reaction section which communicates with the first reaction section and which generates hydrogen gas from the fuel through a reforming reaction using the thermal energy; and a third reaction section which communicates with the first and second reaction sections, and which generates thermal energy through an oxidation reaction of carbon monoxide contained in the hydrogen gas, and reduces the concentration of carbon monoxide.

The first reaction section may generate the thermal energy through an oxidation reaction of carbon monoxide contained in the hydrogen gas at the time of normal operation of the fuel cell system to reduce the concentration of carbon monoxide.

The reformer may be constructed as an assembly having a first vessel, a second vessel which has a sectional area smaller than that of the first vessel and which is disposed at the inner center of the first vessel, and a housing of a tubular shape surrounding the first vessel.

The reformer assembly may have a structure that the space between the first vessel and the second vessel and the inner space of the second vessel communicate with each other through a conduit and the space between the first vessel and the housing and the inner space of the second vessel directly communicate with each other.

The first reaction section generally includes an oxidation catalyst, the second reaction section generally includes a reforming catalyst, and the third reaction section generally includes an oxidation catalyst.

The second reaction section may further include a water-gas shift catalyst which reduces the concentration of carbon monoxide contained in the hydrogen gas through a catalytic water-gas shift reaction of the hydrogen gas.

The reformer may further comprise a heat delivery unit which comes in contact with the second reaction section and preheats the fuel supplied to the second reaction section.

The heat delivery unit may include a pass member which is wound in a coil shape around the outer circumferential surface of the first vessel and which communicates with the space between the first vessel and the second vessel.

According to another embodiment of the present invention, a fuel cell system is provided comprising: a reformer for generating hydrogen gas from fuel through a chemical catalytic reaction using thermal energy; and a stack for generating electric energy through a reaction between the hydrogen gas and oxygen, wherein the reformer is the reformer described above.

The fuel cell system may further comprise a fuel supply unit supplying the fuel to the reformer and the fuel supply unit may include a first tank storing the fuel, a second tank storing water, and a fuel pump connected to the first tank and the second tank. In this case, the first tank and the second vessel may be connected through a conduit. A start-up fuel valve may be provided in the conduit.

The fuel cell system may further comprise an oxygen supply unit supplying oxygen to the reformer and the stack and the oxygen supply unit may include an air pump for producing air to the reformer and the stack.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Hereinafter, exemplary embodiments of the present invention will be described in detail with reference to the attached drawings such that the present invention can be easily put into practice by those skilled in the art. However, the present invention is not limited to the exemplary embodiments, but may be embodied in various forms.

Figure 1:
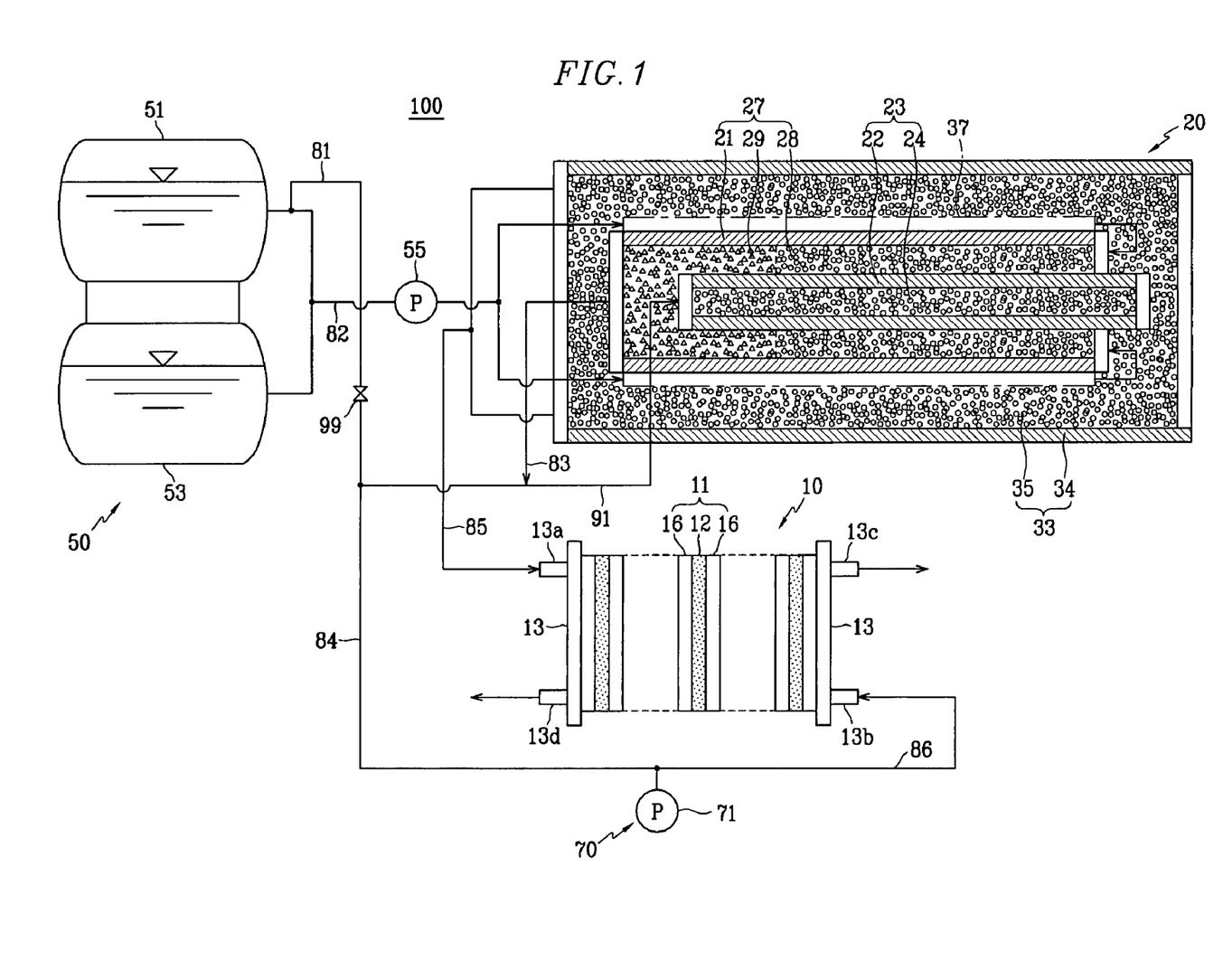
FIG. 1 is a block diagram schematically illustrating an entire construction of a fuel cell system according to an embodiment of the present invention.

FIG. 1 is a block diagram schematically illustrating an entire construction of a fuel cell system according to an embodiment of the present invention.

Referring to FIG. 1, the fuel cell system 100 has a polymer electrode membrane fuel cell (PEMFC) scheme, which reforms fuel to generate hydrogen and allows hydrogen and oxygen to electrochemically react with each other to generate electric energy.

The fuel used for generating electricity in the fuel cell system 100 may include liquid or gas fuel containing hydrogen such as methanol, ethanol, or natural gas. However, liquid fuel is exemplified in the following description for the purpose of convenience. The mixture of liquid fuel and water are defined as a fuel mixture.

The fuel cell system 100 may utilize pure oxygen stored in an additional storage device as the source of oxygen for reacting with hydrogen or may utilize air containing oxygen. The latter is exemplified in the following description.

The fuel cell system 100 comprises a stack 10 for generating electric energy through a reaction between hydrogen and oxygen, a reformer 20 for generating hydrogen gas from the fuel and supplying the generated hydrogen gas to the stack 10, a fuel supply unit 50 for supplying the fuel to the reformer 20, and an oxygen supply unit 70 for supplying oxygen to the stack 10 and the reformer 20.

The stack 10 is connected to the reformer 20 and the oxygen supply unit 70 and serves as a fuel cell which is supplied with hydrogen gas from the reformer 20, and air from the oxygen supply unit 70, and which generates electric energy through a reaction between hydrogen and oxygen. The structure of the stack 10 will be described in more detail later with reference to FIG. 5.

In the present embodiment, the reformer 20 generates hydrogen gas from the fuel through a catalytic chemical reaction with thermal energy and also reduces the concentration of carbon monoxide in the hydrogen gas. The structure of the reformer 20 will be described in more detail later with reference to FIGS. 2 to 4.

The fuel supply unit 50 includes a first tank 51 for storing fuel, a second tank 53 for storing water, and a fuel pump 55 which is connected to the first and second tanks 51 and 53 and which supplies the fuel and the water to the reformer.

The oxygen supply unit 70 includes at least one air pump 71 with a predetermined pumping power for supplying air to the stack 10 and the reformer 20. However, the oxygen supply unit 70 is not limited to an air pump 71, but may include a conventional fan.

Figure 2:
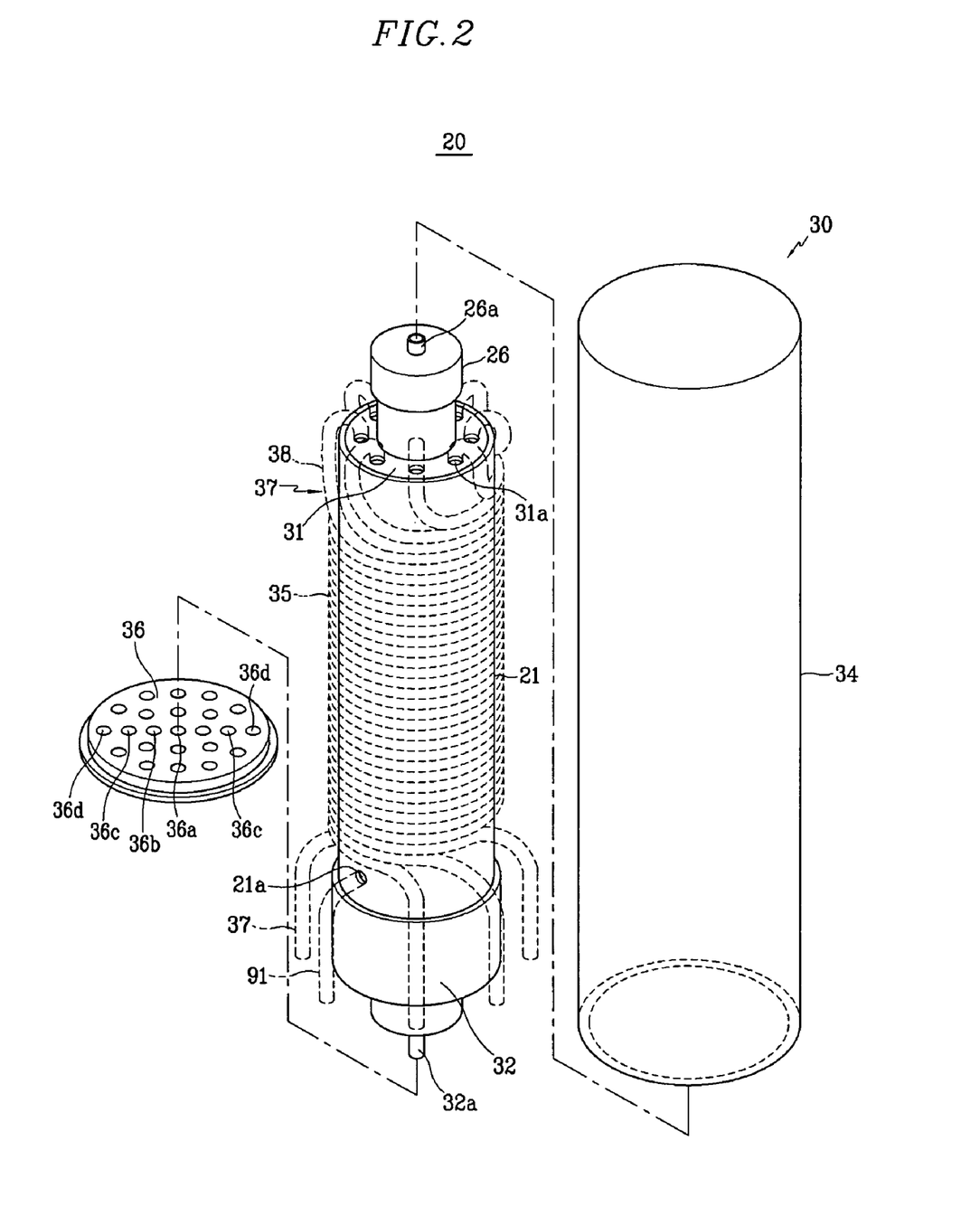
FIG. 2 is an exploded perspective view illustrating a reformer according to an embodiment of the present invention.
Figure 3:
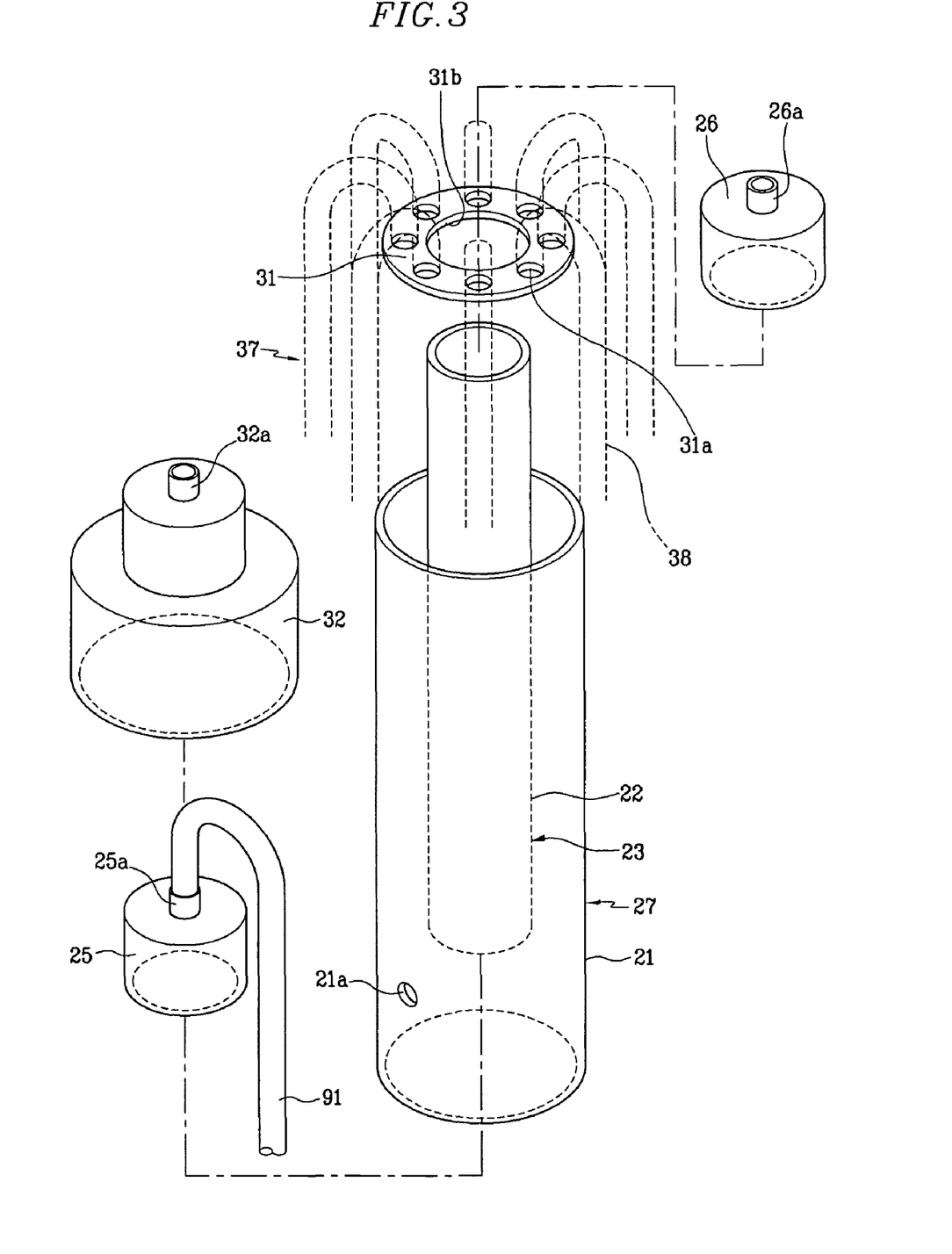
FIG. 3 is a partial exploded perspective view of the reformer shown in FIG. 2.
Figure 4:
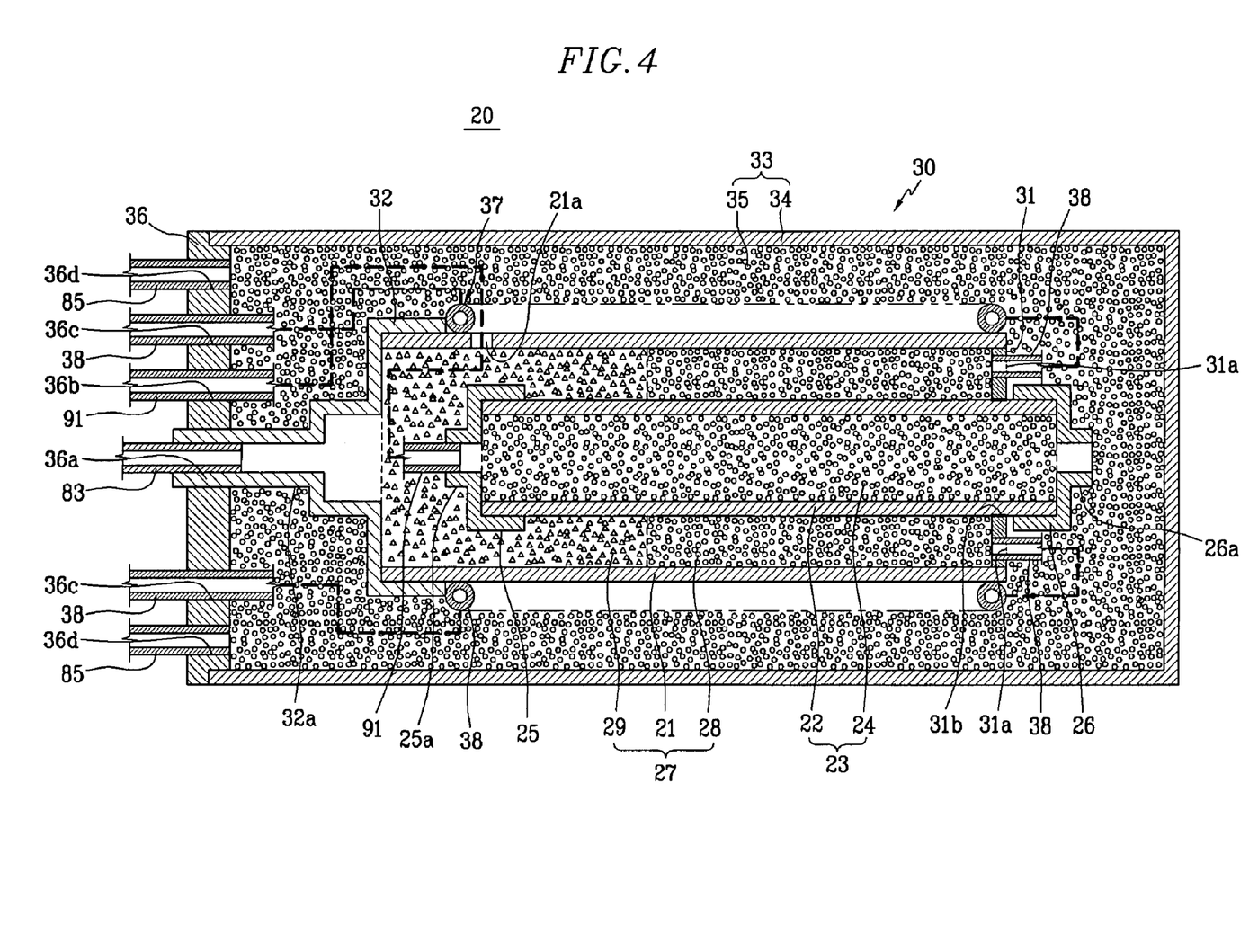
FIG. 4 is a coupled cross-sectional view of the reformer shown in FIG. 2.

FIG. 2 is an exploded perspective view illustrating a reformer according to an embodiment of the present invention, FIG. 3 is a partially exploded perspective view of the reformer shown in FIG. 2, and FIG. 4 is a coupled cross-sectional view of the reformer shown in FIG. 2.

Referring to FIGS. 1 to 4, the reformer 20 includes a first reaction section 23 for generating thermal energy through an oxidation reaction of fuel and air during the start-up of the system, a second reaction section 27 for generating hydrogen gas from the fuel mixture through a reforming reaction using the thermal energy, and a third reaction section 33 for reducing the concentration of carbon monoxide through an oxidation reaction between carbon monoxide in the hydrogen gas and oxygen in the air.

In the reformer according to the present embodiment, the first reaction section 23 and the second reaction section 27 communicate with each other and the first and second reaction sections 23 and 27 and the third reaction section 33 communicate with each other.

The reformer 20 is formed as a reformer assembly 30 of a multiple vessel design. The reformer assembly 30 includes a first vessel 21, a second vessel 22 disposed in the first vessel 21, and a housing 34 surrounding the first vessel 21.

While the first and second vessels and the housing may be of many different shapes, for convenience of illustration, in this embodiment of the invention, the first vessel 21, the second vessel 22, and the housing 34 are shown to be of tubular shapes. The first vessel 21 has a predetermined sectional area and both of its ends are substantially closed. The second vessel 22 has a sectional area smaller than the sectional area of the first vessel 21, and both ends are substantially closed. The second vessel 22 is disposed at the inner center of the first vessel 21 such that the outer circumferential surface of the second vessel 22 and the inner circumferential surface of the first vessel 21 are spaced by a predetermined distance from each other. The housing 34 is also formed in a tubular shape with a sectional area greater than the sectional area of the first vessel 21. One end of the housing 34 is opened and the other end is closed. The first vessel 21 is disposed at the inner center of the housing 34 such that the outer circumferential surface of the first vessel 21 and the inner circumferential surface of the housing 34 are spaced a predetermined distance from each other.

In the reformer 20 having the above-mentioned structure, the space between the first vessel 21 and the second vessel 22 and the inner space of the second vessel 22 communicate with each other through a conduit described later. The space between the first vessel 21 and the housing 33 and the inner space of the second vessel 22 directly communicate with each other.

The first reaction section 23 of the reformer 20 according to the present embodiment has an oxidation catalyst 24 formed in the inner space of the second vessel 22, an injection hole 25a formed at one end of the second vessel 22, and an discharge hole 26a formed at the other end of the second vessel 22.

The injection hole 25a constitutes an inlet for injecting the fuel and the air into the second vessel 22 at the start-up up the reformer 20. The discharge hole 26a constitutes an outlet for discharging combustion gas generated through the oxidation reaction of the fuel and the air in the first reaction section 23 and directly communicates with the space between the first vessel 21 and the housing 34.

Specifically, the first reaction section 23 can be constructed by coupling a first cap 25 having an injection hole 25a to an end of the second vessel 22 and coupling a second cap 26 having a discharge hole 26a to the other end. The first and second caps 25, 26 may be coupled to the second vessel 22 using screw fittings, or various other known coupling methods. A first reaction section inlet conduit 91 feeds air and fuel to the first reaction section via the injection hole 25a of the first cap 25 and communicates with the first tank 51a via first conduit 81, and with the air pump 71 via a fourth conduit 84. A start-up fuel valve 99 provided in the first conduit 81 may be used to selectively block the fuel supplied to the first reaction section of the second vessel. In order to reach the first reaction section, the first reaction section inlet conduit 91 passes through the housing 34 via a second communication hole 36b and through the first vessel 21 via a penetrating hole 21a to connect to the injection hole 25a.

The oxidation catalyst 24 within the inner space of the second vessel 22 promotes the oxidation of the fuel and the air to generate heat. The oxidation catalyst 24 can be provided, for example, as a catalytic material such as platinum (Pt), ruthenium (Ru), or a combination of the two, provided on pellet-shaped carriers made of alumina ($Al_2O_3$), silica ($SiO_2$), or titania ($TiO_2$).

The first reaction section 23 according to the present embodiment may generate thermal energy through the oxidation reaction of carbon monoxide in the hydrogen gas generated from the second reaction section 27 and air using the catalytic operation of the oxidation catalyst 24, thereby reducing the concentration of carbon monoxide.

The second reaction section 27 according to the present embodiment includes reforming catalyst 28 formed in the space between the first vessel 21 and the second vessel 22. An injection hole 31a is formed at one end of the first vessel 21, and a discharge hole 32a is formed at the other end.

The injection hole 31a constitutes an inlet for injecting the fuel mixture into the second reaction section 27 formed in the space between the first vessel 21 and the second vessel 22, and the discharge hole 32a constitutes an outlet for discharging the hydrogen gas generated through the reforming reaction of the fuel mixture.

Specifically, the second reaction section 27 can be constructed by coupling a third cap 31 having one or more injection holes 31a to an end of the first vessel 21 and coupling a fourth cap 32 having a discharge hole 32a to the other end. For this embodiment, the third cap 31 is formed in a ring shape with a coupling opening 31b through which the discharge end of the second vessel 22 passes, and injection holes 31a are disposed around the coupling opening 31b. The third and fourth caps 31, 32 may be coupled to the first vessel 21 using screw fittings, or various other known coupling methods. The injection holes 31a communicate with the first and second tanks 51 and 53 via the second conduit 82 as will be discussed in further detail below. The discharge hole 32a is connected to the first reaction section inlet conduit 91 via the third conduit 83.

The reforming catalyst 28 generates hydrogen by the steam reforming reaction of the fuel mixture using the thermal energy generated from the first reaction section 23. The reforming catalyst 28 is filled in the space between the first vessel 21 and the second vessel 22 and can be provided, for example, as copper (Cu), nickel (Ni), platinum (Pt), or a combination provide on pellet-shaped carriers made of alumina ($Al_2O_3$), silica ($SiO_2$), or titania ($TiO_2$).

The second reaction section 27 may further include a water-gas shift catalyst 29 formed successive to the reforming catalyst 28 in the space between the first vessel 21 and the second vessel 22. The water-gas shift catalyst 29 serves to reduce the concentration of carbon monoxide contained in the hydrogen gas through a water-gas shift reaction (WGS) of the hydrogen gas generated by the reforming catalyst 28. For this embodiment, the water-gas shift catalyst 29 is formed in the vicinity the fourth cap 32 in the space between the first vessel 21 and the second vessel 22. Exemplary water-gas shift catalysts 29 may include copper (Cu), zinc (Zn), iron (Fe), chrome (Cr), or combinations provided on pellet-shaped carriers made of alumina ($Al_2O_3$), silica ($SiO_2$), or titania ($TiO_2$).

The reformer 20 according to the present embodiment further includes a heat delivery unit 37 for maximizing the efficiency of the thermal energy generated from the first reaction section 23. The heat delivery unit 37 includes one or more pass members 38 which can supply thermal energy generated from the first reaction section 23 to preheat the fuel mixture supplied to the second reaction section 27.

The fuel mixture is transferred to the reformer 20 via a second conduit 82 which splits to form pass members 38 which are coiled around the outer circumferential surface of the first vessel 21. After the fuel mixture is preheated in the pass members, it penetrates the first vessel 21 via the injection holes 31a formed in the third cap 31, and enters the second reaction section 27.

The third reaction section 33 according to the present embodiment occupies the space between the first vessel 21 and the housing 34 and is enclosed from the external atmosphere by a fifth cap 36. In the third reaction section 33, carbon monoxide is oxidized using the oxygen contained in the air supplied from the air pump 71. The third reaction section directly communicates with the first reaction section 23 via discharge hole 26a. The oxidation catalyst 35 has the same general structure and composition as the oxidation catalyst 24 in the first reaction section 23.

The fifth cap 36 can be coupled to an end of the housing 34 with a screw coupling or other known coupling methods. The discharge hole 32a of the first vessel 21 penetrates the fifth cap 36 through a first communication hole 36a to join with third conduit 83. Similarly, the first reaction section inlet conduit 91 for supplying air and fuel to the first reaction section during start-up penetrates the fifth cap via second communication hole 36b. The fuel mixture is fed to the second reaction section 27 via the pass members 38 which penetrate the fifth cap 36 via third communication holes 36c. The hydrogen gas stream from the third reaction section 33 exits the third reaction section 33 via a plurality of fourth communication holes 36d in the fifth cap.

Figure 5:
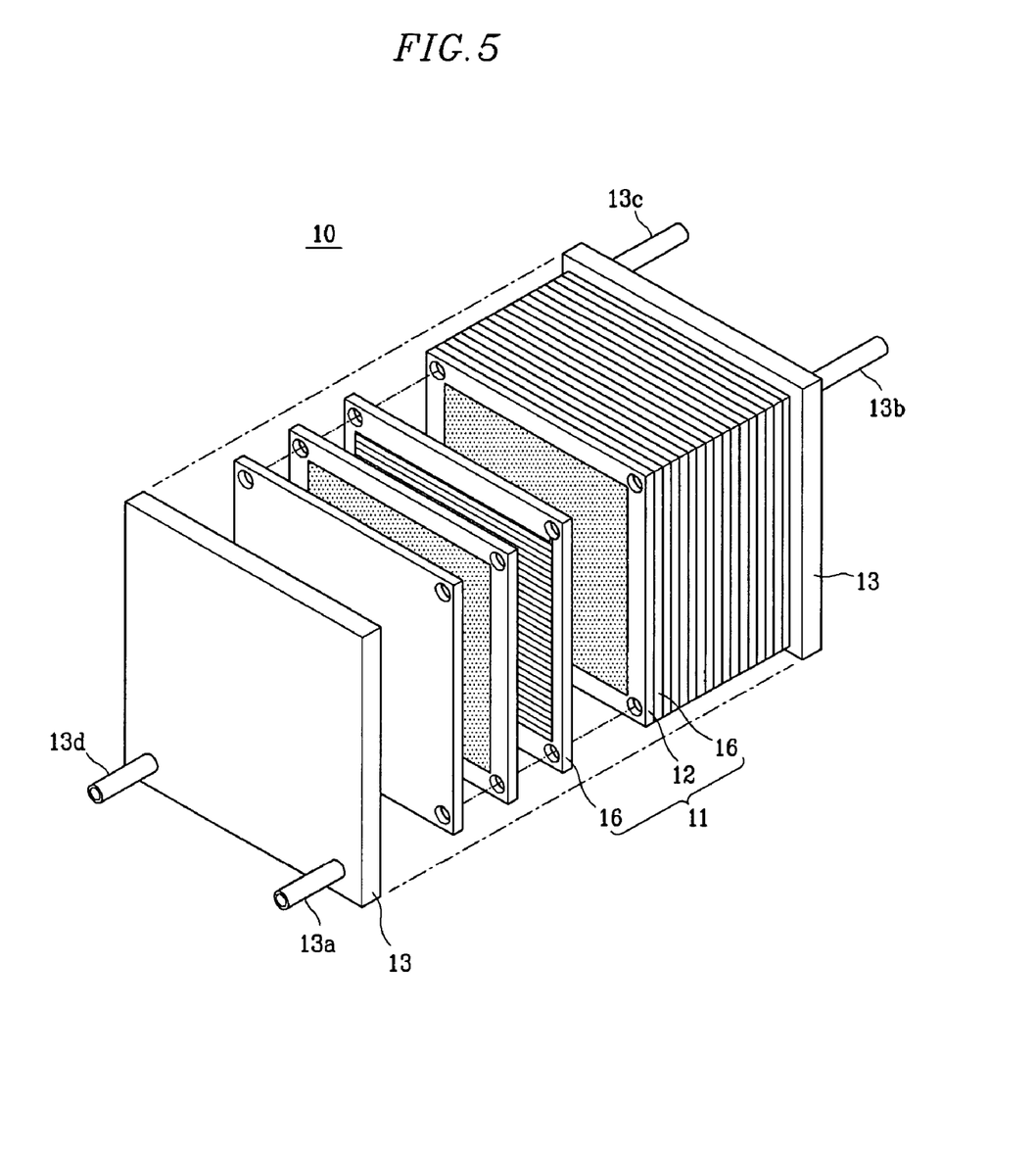
FIG. 5 is an exploded perspective view illustrating a structure of a stack shown in FIG. 1.

FIG. 5 is an exploded perspective view illustrating the structure of the stack shown in FIG. 1.

Referring to FIGS. 1 and 5, the stack 10 of the fuel cell system 100 allows the hydrogen gas supplied from the reformer 20 and oxygen in the air supplied from the air pump 71 to electrochemically react with each other to generate electric energy of a predetermined capacity.

The stack 10 includes unit electricity generators 11 for generating the electric energy, where separators (also referred to as "bipolar plates" in the art) 16 are disposed on both surfaces of a membrane-electrode assembly (hereinafter, referred to as an MEA) 12. Therefore, in the present embodiment, by successively disposing a plurality of the unit electricity generators 11, the stack 10 can be formed as a set of electricity generators 11.

The MEA 12 disposed between the separators 16 has an anode electrode formed on one surface, a cathode electrode formed on the other surface, and an electrolyte membrane formed between the electrodes. The anode electrode decomposes hydrogen into hydrogen ions and electrons. The electrolyte membrane moves the hydrogen ions to the cathode electrode. The cathode electrode generates water through a reaction of the electrons and hydrogen ions supplied from the anode electrode and oxygen in the air.

The separators 22 are closely disposed on both surfaces of the MEA 21 and supply the hydrogen gas produced by the reformer 20 to the anode electrode of the MEA 12 and supply the air from the air pump 71 to the cathode electrode. In addition, the separators function as conductors for connecting the anode electrode and the cathode electrode of the MEA 12 in series to each other.

The outermost sides of the stack 10 may be provided with additional pressing plates 13 for bringing the plurality of electricity generators 11 into close contact with each other. The stack 10 according to the present invention may also be constructed such that the separators 16 located at the outermost sides of the electricity generators 11 function as pressing plates.

In addition, the pressing plates 13 include a first injection hole 13a for supplying the hydrogen gas to the electricity generators 11, a second injection hole 13b for supplying the air to the electricity generators 11, a first discharge hole 13c for discharging the non-reacted hydrogen gas from the electricity generators 11, and a second discharge hole 13d for discharging the non-reacted air along with the water generated through the electrochemical reaction between hydrogen and oxygen from the electricity generators 11. Here, the first injection hole 13a and the fourth communication hole 36d of the housing 34 of the reformer 20 are connected through the fifth conduit 85. The second injection hole 13b and the air pump 71 are connected through the sixth conduit 86.

The assembly of the reformer and the operation of the entire fuel cell system according to an embodiment of the present invention will now be described in detail.

In assembling the reformer 20 according to the present embodiment, first, the first cap 25 is coupled to an end of the second vessel 22 and the second vessel 22 is disposed in the inner space of the first vessel 21. According to this embodiment, the second vessel 22 is disposed at the inner center of the first vessel 21.

The first reaction section inlet conduit passes through the second communication hole 36b of the fifth cap 36 and the penetration opening 21a of the first vessel 21 and is connected to the injection hole 25a of the first cap 25.

Next, the fourth cap 32 is coupled to an end of the first vessel 21 and the water-gas shift catalyst 29 and the reforming catalyst 28 are sequentially filled in the space between the first vessel 21 and the second vessel 22. The third cap 31 is coupled to the other end of the first vessel 21 with the discharge end of the second vessel 22 passes through the coupling opening 31b of the third cap 31.

The oxidation catalyst 24 is then filled in the inner space of the second vessel 22, and the second cap 26 is coupled to the other end of the second vessel 22.

Next, one end of each pass member 38 is connected to the corresponding injection hole 31a of the third cap 31 and the pass members 38 are spirally wound around the outer circumferential surface of the first vessel 21.

The first vessel 21 is then inserted into the inner space of the housing 34 and the oxidation catalyst 35 is filled in the space between the first vessel 21 and the housing 34.

The other ends of the pass members 38 are passed through the third communication holes 36c of the fifth cap 36 and the discharge hole 32a of the first vessel 21 is passed through the first communication hole 36a of the fifth cap 36 and the fifth cap 36 is coupled to the opened end of the housing 34, thereby sealing the inner space of the housing 34.

The other ends of the pass members 38 are connected to the first and second tanks 51 and 53 through the second conduit 82 after the assembly of the reformer 20 is finished. The fifth conduit 85 connected to the first injection hole 13a of the stack 10 is then connected to the fourth communication holes 36d of the fifth cap 36.

Operation of the fuel cell system 100 employing a reformer 20 of the present invention is described now. First, the fuel pump 55 supplies the fuel stored in the first tank 51 to the first reaction section 23 through the first conduit 81. During start-up, flow is maintained through the first conduit 81 by manipulation of the start-up fuel valve 99.

At the same time, the air pump 71 supplies air to the first reaction section 23, through the fourth conduit 84. The fuel from the first conduit 81 and the air from the fourth conduit first merge via the first reaction section inlet conduit 91 and are then injected into the first reaction section 23.

In the first reaction section 23, the fuel and the air are oxidized in the oxidation catalyst 24, thereby generating heat which is transferred through the walls of the second vessel and into the second reaction section. The flow of fuel, air and combustion gasses continues through the discharge hole 26a of the first reaction section 23 and into the third reaction section 33 where further oxidation of the fuel gas may occur. Any further oxidation that occurs in the third reaction section 33 along with the mere passage of the hot combustion gasses through the third reaction section 33 further helps to heat the second reaction section 27 and the pass members 38.

The fuel pump 55 then starts to supply fuel stored in the first tank 51 and water stored in the second tank 53 to the second reaction section 27 via second conduit 82 and the pass members 38 where the fuel mixture is preheated prior to entering the second reaction section.

Upon entering the second reaction section 27, the preheated fuel mixture absorbs the thermal energy supplied from the first reaction section 23 while passing through the reforming catalyst 28 disposed in the second reaction section 27. There, the fuel mixture is converted to a hydrogen gas stream which also contains carbon monoxide as a byproduct.

Next, the hydrogen gas stream passes through the water-gas shift catalyst 29 where additional hydrogen is generated and a portion of the carbon monoxide is consumed by the water-gas shift reaction, thereby primarily reducing the concentration of carbon monoxide contained in the hydrogen gas stream.

While the water-gas shift reaction helps to reduce the amount of carbon monoxide in the hydrogen gas stream, the hydrogen gas stream still contains a small amount of carbon monoxide. In the second reaction section 27, the thermal energy generated from the first reaction section 23 is partially consumed in the steam reforming reaction of the fuel mixture, and thus a temperature of less than about 100° C. is maintained.

Subsequently, the hydrogen gas stream is discharged from the second reaction section through the discharge hole 32*a* of the fourth cap 32. Then, the hydrogen gas stream is supplied to the first reaction section inlet conduit 91 through the third conduit 83. Once a proper temperature has been attained, the flow of fuel through the first conduit 81 is stopped by closing the start-up fuel valve 99. Then, the air supplied from the air pump 71 through the fourth conduit 84 and the hydrogen gas stream join and enter the first reaction section through the first reaction section inlet conduit 91.

In the first reaction section 23, a portion of the remaining carbon monoxide is oxidized while passing through the oxidation catalyst 24. From the first reaction section 23, the combined hydrogen gas stream and air continue to the third reaction section 33 via the discharge hole of the first reaction section. In the third reaction section 33, still further oxidation of the carbon monoxide occurs on the oxidation catalyst 35. In the first reaction section 23 and the third reaction section 33, the concentration of carbon monoxide is secondarily reduced by a preferential CO oxidation (PROX) reaction of the carbon monoxide contained in the hydrogen gas.

In oxidizing the carbon monoxide, heat is generated by the first reaction section 23 and the third reaction section 33 which is consumed in part by the reforming reaction of the second reaction section 23, and also by preheating the fuel mixture that is fed to the second reaction section 23 via the pass members 38. By this method, the first reaction section 23 and the third reaction section 33 can maintain a temperature range of about 100° C. to 200° C. while also reducing the concentration of carbon monoxide contained in the hydrogen gas stream.

Next, the hydrogen gas stream in which the concentration of carbon monoxide has been reduced is supplied to the first injection hole 13*a* of the stack 10 through the fifth conduit 85. At the same time, the air pump 71 supplies air to the second injection hole 13*b* of the stack 10 through the sixth conduit 86.

The stack 10 then outputs the electric energy of a predetermined capacity through the electrochemical reaction between hydrogen and oxygen in the electricity generators 11.

According to the present invention described above, since there is provided a reformer having a simple structure which can rapidly deliver the thermal energy necessary for various reactions of the fuel, it is possible to enhance the thermal efficiency and the operating ability of the fuel cell system and also to embody the entire fuel cell system in a compact size.

According to the present invention, since there is provided a structure that can preheat the fuel supplied to the reformer, it is possible to enhance the thermal efficiency and the operating ability of the entire fuel cell system.

In addition, according to the present invention, by preventing excess heat during the oxidation reaction for reducing the concentration of carbon monoxide contained in the hydrogen gas stream, combustion of hydrogen is avoided, further enhancing the efficiency of the reformer.

Although the exemplary embodiments of the present invention have been described, the present invention is not limited to the embodiments, but may be modified in various forms without departing from the scope of the appended claims, the detailed description, and the accompanying drawings of the present invention. Therefore, it is natural that such modifications belong to the scope of the present invention.

What is claimed is:

1. A fuel cell system comprising:
a stack adapted to generate electric energy through a reaction between a hydrogen gas stream and oxygen; and
a reformer adapted to generate the hydrogen gas stream from a fuel, wherein the reformer comprises:
a first reaction section configured to receive a first portion of the fuel and to promote an oxidation reaction of the first portion of the fuel during start-up of the fuel cell system, thereby generating thermal energy, wherein the first reaction section comprises an oxidation catalyst for a catalytic oxidation reaction of carbon monoxide contained in the hydrogen gas stream during normal operation of the fuel cell system to thereby reduce the concentration of carbon monoxide in the hydrogen gas stream;
a second reaction section which communicates with the first reaction section, and which is adapted to receive a remaining portion of the fuel other than the first portion and to promote a reforming reaction using the thermal energy, thereby producing the hydrogen gas stream from the remaining portion of the fuel;
a third reaction section which communicates with the first and second reaction sections, and which is adapted to promote a catalytic oxidation reaction of carbon monoxide contained in the hydrogen gas stream to thereby reduce the concentration of carbon monoxide in the hydrogen gas stream, and
a first vessel, a second vessel, and a housing, wherein the second vessel is disposed within the first vessel and the first vessel is disposed within the housing and the second vessel forms the first reaction section, the space between the first and second vessels forms the second reaction section, and the space between the first vessel and the housing forms the third reaction section, and
wherein the second reaction section communicates with the first reaction section via a conduit, and an outer side wall portion of the second vessel extends beyond the first vessel to define a space between the outer side wall portion of the second vessel and the housing.

2. The fuel cell system of claim 1, wherein the second reaction section comprises a reforming catalyst.

3. The fuel cell system of claim 2, wherein the second reaction section further comprises a water gas shift catalyst.

4. The fuel cell system of claim 3 wherein the water gas shift catalyst is located downstream of the reforming catalyst.

5. The fuel cell system of claim 2, wherein the oxidation catalyst is a first oxidation catalyst, and the third reaction section comprises a second oxidation catalyst.

6. The fuel cell system of claim 1, wherein the reformer further comprises a first cap defining a first reaction section injection hole coupled to a first end of the second vessel and a second cap defining a first reaction section discharge hole coupled to a second end of the second vessel.

7. The fuel cell system of claim 6, wherein the reformer further comprises a third cap defining at least one second reaction section injection hole coupled to a first end of the first vessel and a fourth cap defining a second reaction section discharge hole coupled to a second end of the first vessel.

8. The fuel cell system of claim 7, wherein the reformer further comprises a fifth cap coupled to an end of the housing.

9. The fuel cell system of claim 1, wherein the reformer further comprises a heat delivery unit adapted to deliver thermal energy from the first and third reaction sections to the fuel supplied to the second reaction section.

10. The fuel cell system of claim 9, wherein the heat delivery unit comprises at least one tubular pass member wound in a coil shape around the outer circumferential surface of the first vessel.

11. The fuel cell system of claim 1, further comprising a fuel supply unit adapted to supply the fuel to the reformer, wherein the fuel supply unit comprises
  a fuel tank adapted to contain the fuel;
  a water tank adapted to contain water; and
  a fuel pump connected to the fuel tank and the water tank.

12. The fuel cell system of claim 11 wherein the fuel tank and the first reaction section are connected by a conduit.

13. The fuel cell system of claim 12 further comprising a valve in the conduit.

14. The fuel cell system of claim 1, further comprising an air pump adapted to supply oxygen to the reformer and the stack.

* * * * *